United States Patent
Kaybidge et al.

(10) Patent No.: US 10,670,112 B2
(45) Date of Patent: Jun. 2, 2020

(54) DEADLINE ANCHOR PIGTAIL CLAMP (71) Applicant: National Oilwell Varco, L.P., Houston, TX (US)

(72) Inventors: Reece William Kaybidge, Sprucegrove (CA); Lucas Arnesen Nealon, Edmonton (CA)

(73) Assignee: National Oilwell Varco, L.P., Houston, TX (US)

( * ) Notice: Subject to any disclaimer, the term of this patent is extended or adjusted under 35 U.S.C. 154(b) by 281 days.

(21) Appl. No.: 15/483,477

(22) Filed: Apr. 10, 2017

(65) Prior Publication Data
US 2018/0291981 A1 Oct. 11, 2018

(51) Int. Cl.
*F16G 11/12* (2006.01)
*E21B 19/02* (2006.01)

(52) U.S. Cl.
CPC .............. *F16G 11/12* (2013.01); *E21B 19/02* (2013.01)

(58) Field of Classification Search
CPC ...... F16G 11/048; F16G 11/044; F16G 11/04; F16G 11/12; E21B 19/02
See application file for complete search history.

(56) References Cited

U.S. PATENT DOCUMENTS

| | | | |
|---|---|---|---|
| 1,049,170 A | * | 12/1912 | Thomas ..................... B05C 3/12 118/405 |
| 1,471,583 A | * | 10/1923 | Andersen .................. F16N 7/00 184/15.1 |
| 1,509,906 A | | 9/1924 | Goss |
| 1,849,924 A | | 3/1932 | Hall |
| 1,896,415 A | | 2/1933 | McDonald |
| 1,953,860 A | * | 4/1934 | Kraatz .................. F16G 11/046 24/115 R |
| 2,187,960 A | | 1/1940 | Allyn |
| 2,190,880 A | | 2/1940 | Moss |

(Continued)

FOREIGN PATENT DOCUMENTS

EP 1916450 4/2008

OTHER PUBLICATIONS

"Assembly, Wire Line Guide Roller Type", internal Varco B.J. Drilling Systems drawing for fabrication purposes, dated Nov. 15, 1990 (1 page).

(Continued)

*Primary Examiner* — Michael E Gallion
(74) *Attorney, Agent, or Firm* — Schwegman Lundberg & Woessner, P.A.

(57) ABSTRACT

An anchor for clamping a handling system deadline and controlled by an actuator, such as a hydraulic cylinder or a gearbox coupled to an electric motor. The anchor may generally operate using a pivoting clamping mechanism, wherein the deadline is held between a static clamp plate and a pivoting clamp plate. The pivoting clamp plate may pivot at a pivot point arranged between the two plates. A bolt may be arranged through an opening in each of the clamp plates. A first end of the bolt may extend beyond an outer surface of the pivoting clamp plate and couple to an end block. At a second end, the bolt may extend beyond an outer surface of the static clamp plate and couple to the actuator. As a linear force is applied to the bolt by the actuator, the bolt may pull the pivoting clamp plate toward the static clamp plate.

20 Claims, 4 Drawing Sheets

(56) References Cited

U.S. PATENT DOCUMENTS

| | | | |
|---|---|---|---|
| 2,199,370 A * | 4/1940 | Card | F16G 11/06 |
| | | | 24/134 R |
| 2,238,398 A | 4/1941 | Reed | |
| 2,316,727 A | 4/1943 | Thompson | |
| 2,329,529 A | 9/1943 | Gwinn | |
| 2,480,488 A | 8/1949 | MacClatchie | |
| 2,486,071 A | 10/1949 | Smith | |
| 2,495,039 A | 1/1950 | Tuel | |
| 2,529,486 A | 11/1950 | Clarkson | |
| 2,552,924 A | 5/1951 | Athy et al. | |
| 2,565,693 A | 8/1951 | Lewis | |
| 2,657,011 A | 10/1953 | Slonneger | |
| 2,681,793 A | 6/1954 | Miller | |
| 2,695,770 A | 11/1954 | Stone | |
| 3,295,832 A | 1/1967 | Fowler | |
| 3,562,875 A * | 2/1971 | Lindsey et al. | F16G 11/06 |
| | | | 403/344 |
| 3,616,517 A * | 11/1971 | Stanwood et al. | F16G 11/048 |
| | | | 140/113 |
| 3,833,971 A * | 9/1974 | Grasman | F16G 11/048 |
| | | | 24/132 R |
| 3,879,809 A * | 4/1975 | Lindsey | H01R 4/46 |
| | | | 24/135 L |
| 3,951,235 A | 4/1976 | Acerbi | |
| RE29,493 E | 12/1977 | Crump | |
| 4,069,921 A | 1/1978 | Raugulis et al. | |
| 4,106,156 A | 8/1978 | Fisher et al. | |
| 4,169,427 A | 10/1979 | Crump et al. | |
| 4,296,837 A | 10/1981 | Charlton | |
| 4,336,866 A | 6/1982 | Blanton, Jr. | |
| 4,349,952 A | 9/1982 | Decker et al. | |
| 4,498,558 A * | 2/1985 | Bendahan | D07B 7/12 |
| | | | 15/220.4 |
| 4,536,921 A * | 8/1985 | Brendel | B66B 7/08 |
| | | | 24/132 WL |
| 4,862,996 A * | 9/1989 | Chisholm | F16N 7/00 |
| | | | 184/15.1 |
| 5,645,269 A * | 7/1997 | Peterson | B66D 1/36 |
| | | | 254/393 |
| 5,941,653 A * | 8/1999 | Cipriani | B60M 1/20 |
| | | | 403/344 |
| 6,234,277 B1 * | 5/2001 | Kaczmarek | B66B 7/06 |
| | | | 174/42 |
| 6,471,191 B1 | 10/2002 | Rotzler et al. | |
| 6,783,593 B2 * | 8/2004 | Selcer | D07B 7/12 |
| | | | 118/125 |
| 7,222,840 B1 * | 5/2007 | Stepper | A01K 69/00 |
| | | | 254/391 |
| 7,475,867 B1 | 1/2009 | Romo | |
| 8,047,506 B2 * | 11/2011 | Student | C10M 103/00 |
| | | | 254/134.3 R |
| 8,317,160 B2 | 11/2012 | Romo et al. | |
| 8,511,645 B2 | 8/2013 | Taddei | |
| 9,249,643 B2 * | 2/2016 | Melancon | E21B 33/063 |
| 9,496,700 B2 * | 11/2016 | Bundren | H02G 7/056 |
| 9,796,567 B2 * | 10/2017 | Krijnen | B66D 1/36 |
| 2007/0155562 A1 | 6/2007 | Stubenrauch | |
| 2007/0278465 A1 | 12/2007 | Letellier | |
| 2010/0299884 A1 * | 12/2010 | Ting | B60P 7/0807 |
| | | | 24/127 |
| 2014/0291030 A1 | 10/2014 | Urquhart | |
| 2015/0353331 A1 | 12/2015 | Krijnen | |
| 2016/0122163 A1 | 5/2016 | Krijnen | |

OTHER PUBLICATIONS

"Stabilizer Assembly", internal National Oilwell Varco drawing for fabrication purposes, dated Nov. 12, 2007 (1 page).

"Wire Line Guides Parts and Price List", Byron Jackson Tools, Inc. Oil Field Tools, Oil Field Rubber Products, and Oil Field Pumps Catalog, 1959 (3 pages).

International Search Report and Written Opinion for related PCT Application No. PCT/US2015/062896 dated Aug. 3, 2016 (12 pages).

International Search Report and Written Opinion for related PCT Application No. PCT/US2018/023321 dated Jun. 18, 2018 (16 pages).

International Search Report and Written Opinion for related PCT Application No. PCT/US2018/026660 dated Jul. 20, 2018 (14 pages).

"International Application Serial No. PCT/US2018/026660, International Preliminary Report on Patentability dated Mar. 15, 2019", 6 pgs.

\* cited by examiner

DEADLINE ANCHOR PIGTAIL CLAMP

FIELD OF THE INVENTION

The present disclosure relates to an anchor for anchoring a line, such as a wire, guidewire, guideline, cable, cord, rope, wire rope, or other relatively flexible tension carrying element. Particularly, the present disclosure relates to an anchor for anchoring a deadline on a handling system. More particularly, the present disclosure relates to an anchor for anchoring a deadline, wherein the anchor is hydraulically or electrically powered and is readily operable and closeable.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A drilling derrick, mast, or other lifting or handling system often has a cable or wireline used to raise and lower a traveling block and drill hook. A fast line portion of the cable or wireline may extend from a drawworks to a crown block. A deadline may extend from the crown block to a spooler, storage reel, or reserve line drum. A deadline anchor is often used between the spooler and crown block to clamp or hold the deadline in a static position, such that the drawworks may be used to raise and lower the traveling block and drill hook. Stress on the cable from use may create a need to "slip and cut" a portion of the cable, which may require loosening of the deadline anchor. That is, occasionally or at intervals, a portion of the cable may be released from the spooler such that a portion of the cable arranged between the drawworks and spooler may be shifted onto or toward the drawworks and excess line on the drawworks may be cut away.

Deadline anchors typically use a plurality of bolts to exert a clamping force on the deadline. For example, 6, 8, 14, or any other suitable number of bolts may be configured to hold a bolt plate against the deadline or pinch the deadline. The bolts are typically tightened and loosened manually or at least partially manually. Moreover, in order to maintain equal application of force on the bolt plate, the plurality of bolts are typically tightened and loosened in a particular order or pattern and with a particular torque. Due to slip and cut operations and other operations, the deadline anchor may need to be frequently loosened and retightened. The process of loosening and retightening a plurality of bolts can be time consuming, particularly where a bolt pattern, order, and/or torque is maintained when tightening and loosening.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, relates to a deadline anchor for a handling system, the deadline anchor having a pair of clamp plates configured to receive a deadline therebetween, a bolt arranged through an opening in each of the clamp plates, the bolt having an anchoring portion, and an actuator coupled to the bolt and configured to apply a force to the bolt. In some embodiments, at least one clamp plate may be configured to pivot about a pivot point arranged at a first end of the pair of clamp plates. Moreover, the clamp plates may be configured to receive the deadline anchor at a location between the first end and the bolt. In some embodiments, the actuator may include a hydraulic cylinder or a gearbox. The gearbox may have a primary gear and a rotating shaft in communication with the primary gear. Moreover, where the actuator is a gearbox, an electric motor may be coupled to the gearbox. In some embodiments, the deadline anchor may have a pair of clamp inserts, each clamp insert arranged between a clamp plate and the deadline. The deadline anchor may have a spacer arranged between the actuator and the pair of clamp plates. The bolt may be arranged through an opening in the spacer. In some embodiments, the bolt may have a swivel point. In some embodiments, the deadline anchor may have at least one spring arranged on the bolt and configured to provide a visual indication of force on the bolt. In some embodiments, the at least one spring may be a Belleville spring. The deadline anchor may have an end block coupled to the bolt near an outer surface of one of the clamp plates. In some embodiments, where the actuator includes a hydraulic cylinder, the deadline anchor may have a clamping force alert system, the alert system having a plunger extending from a housing, and a spring arranged within the housing. The housing may be coupled to the hydraulic cylinder via a pressure line, and when an effective amount of hydraulic pressure is applied to the bolt, the pressure in the line may cause the spring to compress and the plunger to retract. The deadline anchor may additionally or alternatively have a pressure relief valve arranged on one of the clamp plates and having a pin. The pressure relief valve may be configured to open to release hydraulic pressure when the pine touches the second clamp plate. In some embodiments, the deadline anchor may have a strain gauge arranged on the bolt. Moreover, a power cut sensor may be communicably coupled to the strain gauge.

The present disclosure, in another embodiment, relates to a method of tightening a deadline anchor, the method including the step of applying a linear force to a bolt, the bolt arranged through a pivoting clamp plate and a static clamp plate, and coupled to an end block arranged near an outer surface of the pivoting clamp plate. Applying the linear force to the bolt may cause the bolt to pull the pivoting clamp plate about a pivot point and toward the static clamp plate. In some embodiments, the method may additionally include tightening a nut on the bolt to secure the bolt with respect to the clamp plates. Applying a linear force may include activating a hydraulic cylinder in some embodiments. In other embodiments, applying a linear force may include activating a gearbox comprising a worm gear.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to a novel and advantageous anchor for clamping a handling system deadline, such as on an oil derrick or mast. In some embodiments, the anchor may be controlled hydraulically via a hydraulic cylinder. In other embodiments, the anchor may be controlled electrically by a gearbox coupled to an electric motor or other suitable power source. Deadline anchors of the present disclosure may generally be configured to readily open and close around a deadline. Deadline anchors of the present disclosure may allow rig operators to efficiently release the deadline, so as to perform a slip and cut operation for example, and efficiently re-clamp the deadline. In some embodiments, deadline anchors of the present disclosure may have one or more safety mechanisms to alert rig operators of potential failures or slippage of the deadline. Deadline anchors of the present disclosure may generally allow for fast, efficient, and safe deadline operations.

Deadline anchors of the present disclosure may generally operate using a pivoting clamping mechanism, wherein the deadline is held between a static clamp plate and a pivoting clamp plate. The pivoting clamp plate may be configured to pivot at a pivot point arranged between the two plates and at a first end of the plates. A bolt may be arranged through an opening in each of the clamp plates. A first end of the bolt may extend beyond an outer surface of the pivoting clamp plate and couple to an end block. At a second end, the bolt may extend beyond an outer surface of the static clamp plate and couple to a hydraulic cylinder, a gearbox, or another suitable means for applying force to the bolt. As a linear force is applied to the bolt, the bolt may pull the pivoting clamp plate toward the static clamp plate. The deadline may be arranged between the clamp plates, and at a location between the pivot point of the pivoting clamp plate and the location of the bolt. In this way, the moment arm between the location of the bolt and the pivot point may provide a mechanical advantage in clamping the deadline.

Figure 1:
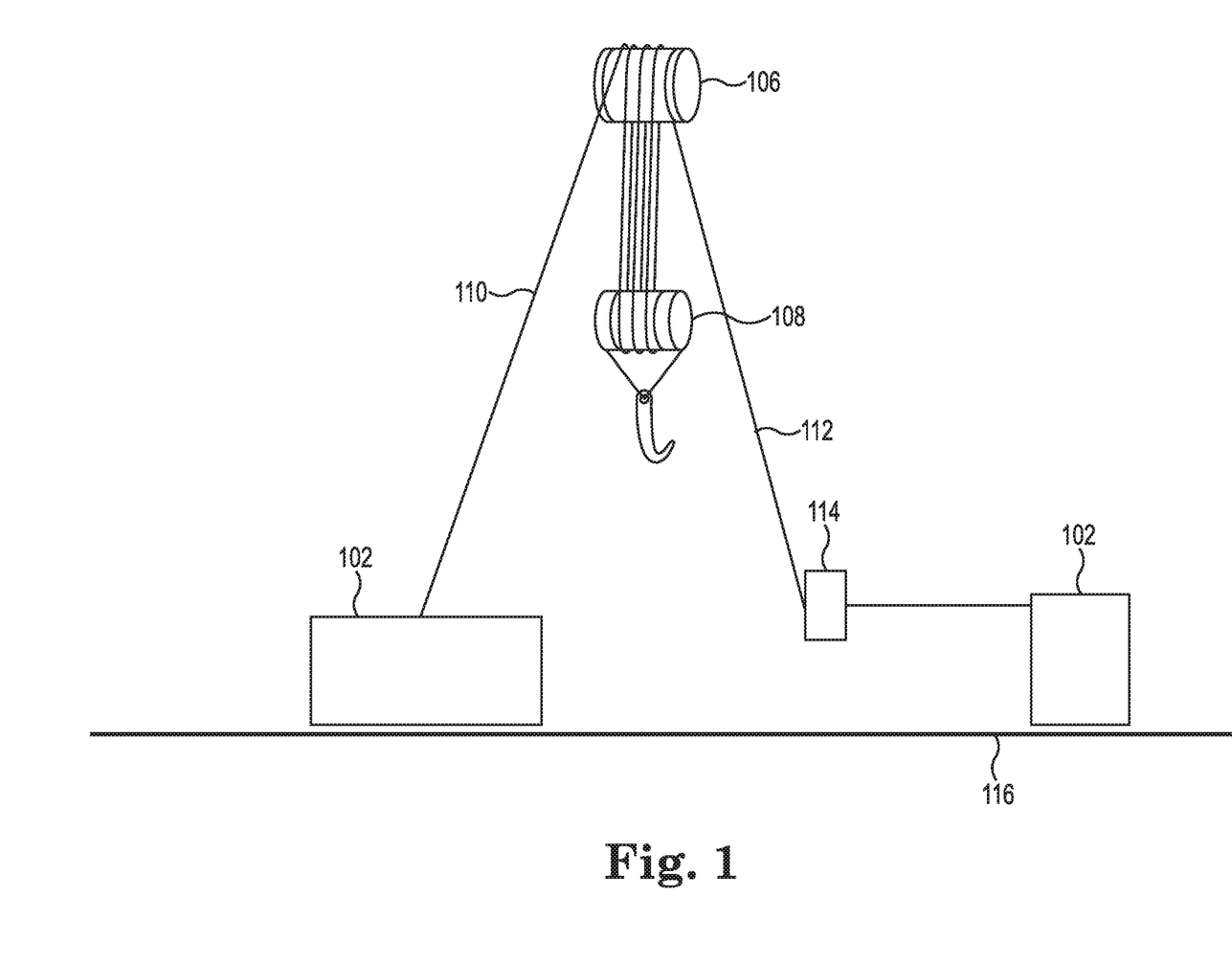
FIG. 1 is a schematic drawing of a drilling line of the present disclosure, according to one or more embodiments.

Turning now to FIG. 1, a drilling line configuration is shown, according to at least one embodiment. As shown, a drilling line may generally be arranged between a drawworks 102 and spooler 104 on a drill floor 116. The portion of the drilling line commonly referred to as a fast line 110 may extend between the drawworks 102 and a crown block 106. The drilling line may be reeved between the crown block 106 and a traveling block 108. In some embodiments, the crown block 106 and traveling block 108 may generally be arranged on or within a derrick or mast (not shown). The drilling line may extend between the crown block 106 and spooler 104 via a portion of the line referred to as a deadline 112. While multiple portions of the drilling line have been identified, it should be understood that the drilling line may be substantially continuous from the drawworks to the spooler.

As may be appreciated, the deadline 112 may generally remain static while the drawworks 102 operates the fast line 110 to raise and lower the traveling block 108. Accordingly, a deadline anchor 114 may operate on the deadline 112 to hold or clamp the deadline in a static position. The deadline anchor 114 may generally be arranged near the spooler 104 in some embodiments. In some embodiments, the deadline anchor 114 may be arranged on or near the drill floor 116.

As described above, some operations may require loosening and/or tightening of the deadline anchor 114. For example, in a slip and cut operation, the deadline anchor 114 may be loosened, such that a portion of drilling line on the spooler 104 may be released, the drilling line may generally shift toward the drawworks 102, and a portion of the line at the drawworks end may be cut away. Such operations may allow the working portion of the line to be moved, such that the traveling block 108 and crown block 106 do not continue to stress a same length of the line. Once the slip and cut operation is completed, the deadline anchor 114 may be retightened on the deadline. Slip and cut operations may be performed intermittently or at intervals. For example, in some embodiments, slip and cut operations may be performed at approximately 2-6 week intervals in order to maintain the deadline. In other embodiments, slip and cut operations may be performed at any suitable intervals. Other operations, including maintenance on the line, anchor 114, traveling block 108, crown block 106, for example, may require loosing and/or tightening of the anchor as well.

Figure 2:
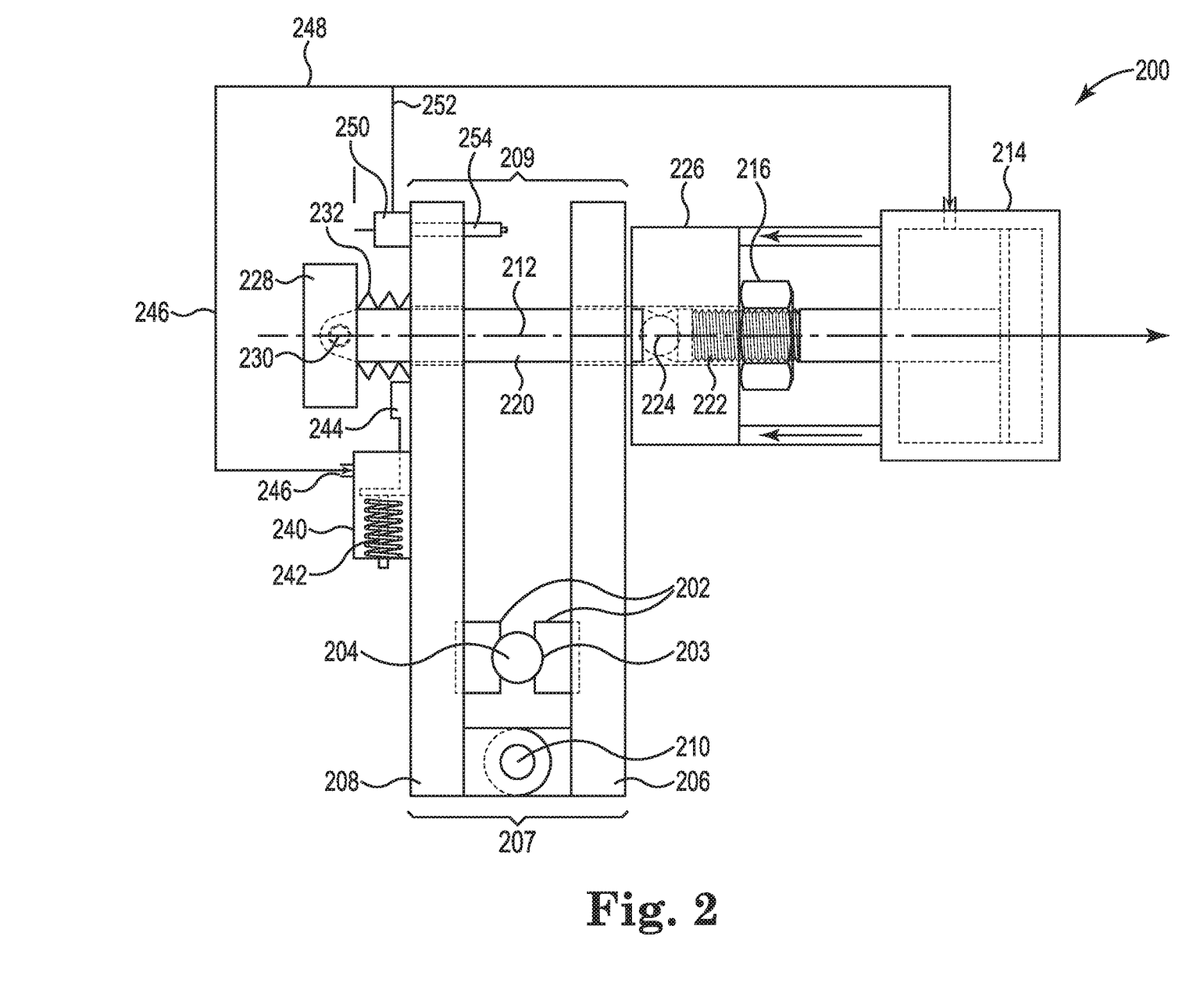
FIG. 2 is a schematic drawing of a deadline anchor of the present disclosure, according to one or more embodiments.

Turning now to FIG. 2, a deadline anchor 200 of the present disclosure is shown, according to at least one embodiment. The deadline anchor 200 may generally have two clamp inserts 202 configured for clamping a drilling line 204 in place. The clamp inserts 202 may be arranged between a static clamp plate 206 and a pivoting clamp plate 208. A bolt 212 may be arranged through the two clamp plates 206, 208 and may be configured to generally pull or push the two plates together. A hydraulic cylinder 214 may act on the bolt 212 to tighten the clamp plates 206, 208, and a nut 216 may generally hold the bolt in place.

The clamp inserts 202 may each be arranged between the clamped deadline 204 and a clamp plate 206, 208. Each clamp insert 202 may be configured to apply clamping pressure directly to the deadline 204. In some embodiments, the deadline anchor 200 may have two clamp inserts 202. In other embodiments, the deadline anchor 200 may have any other suitable number of clamp inserts 202. The clamp inserts 202 may be sized to accommodate the diameter or width of the deadline 204 in some embodiments. Each clamp insert 202 may have a rectangular or square shape in some embodiments. In other embodiments, the clamp inserts 202 may have any other suitable shape. In some embodiments, the clamp inserts 202 may each have a groove or notch 203 configured to accommodate the deadline 204. For example, the groove or notch 203 may be sized and shaped to match, coincide with, or resemble the outer surface curvature of the deadline 204. In this way, the clamp inserts 202 may at least partially wrap around the deadline 204 for a tight fit and/or more even application of force to the deadline. The clamp inserts 202 may be composed of any suitable materials. In some embodiments, the clamp inserts 202 may be composed of brass or a similar soft metal. The clamp inserts 202 may be removably or fixedly coupled to the clamp plates 206, 208 using any suitable attachment means. The clamp inserts 202 may be configured to be removable from the anchor 200, such that they may be replaced after experiencing deformation, for example. It may be appreciated that in some embodiments, the deadline anchor 200 may operate without the use of clamp inserts 202.

The clamp plates 206, 208 may generally apply a clamping force to the deadline 204, which may be applied via the clamp inserts 202 in some embodiments. The clamp plates 206, 208 may be arranged generally parallel to one another. In some embodiments, a first clamp plate, such as the static clamp plate 206, may be generally static while a second clamp plate, such as the pivoting clamp plate 208, may be pivotable. The clamp plates 206, 208 may be coupled together at a pivot point 210. In some embodiments, the pivot point 210 may be arranged at a location at or near a first end 207 of the two clamp plates 206, 208. In other embodiments, the pivot point 210 may be arranged at any other suitable location with respect to the clamp plates 206, 208. In some embodiments, the static clamp plate 206 may be statically coupled to the pivot point 210. Further, the pivoting clamp plate 208 may be pivotably coupled to the pivot point 210. In this way, the pivoting clamp plate 208 may generally be configured to pivot toward and/or away from the static clamp 206. In other embodiments, both clamp plates may be pivotable about the pivot point 210 or the position of the static and/or pivoting plates may be varied. Each clamp plate 206, 208 may have an opening configured to receive the bolt 212.

The bolt 212 may be arranged through openings in each of the static clamp plate 206 and pivoting clamp plate 208. By an applied force from the hydraulic cylinder 214, the bolt 212 may generally be configured to pull the pivoting clamp plate 208 toward the static clamp plate 206. In some embodiments, the bolt 212 may be arranged at a location at or near an end of the two clamp plates 206, 208, such as at a second end 209 opposing the first end 207. Moreover, as shown for example in FIG. 2, the clamp plates 206, 208 and clamp inserts 202 may be configured to receive the deadline 204 at a location between the locations of the pivot point 210 and the bolt 212. In some embodiments, the deadline 204 may be received nearer the pivot point 210 than the bolt 212. In this way, the deadline anchor 200 may be configured to leverage the pivoting clamp plate 208 as a force amplifier. That is, because the pivoting clamp plate 208 acts as a moment arm between the force applied at the bolt 212 and the pivot point 210, and because the deadline 204 is arranged at a location closer to the pivot point than the bolt, the clamping force applied to the deadline may be greater than that applied at the bolt. It is to be appreciated that a ratio of clamping force applied to the bolt 212: a clamping force applied to the deadline 204 may equal, or at least relate to, the inverse of a ratio of the length from the center of the bolt to the center of the pivot point 210: the length from the center of the deadline to the center of the pivot point. The amount of force applied to the bolt 212 to maintain an appropriate or desired clamping force on the deadline 204 may be based, at least in part, on a hookload, a number of lines reeved between a traveling block and crown block, a number of windings of the deadline 204 around an anchor drum, available hydraulic pressure or other available power output for clamping, clamping plate material, and/or other factors.

The hydraulic cylinder 214 may be configured to act on the bolt 212, thus pulling the pivoting clamp plate 208 toward the static clamp plate 206. The hydraulic cylinder 214 may have any suitable size and capacity. It may be appreciated that, due to the force amplification of the moment arm of the pivoting clamp plate 208 discussed above, a relatively low capacity hydraulic cylinder may be used. That is, the hydraulic cylinder 214 may have a lower capacity than one that would be needed to directly apply a clamping force to the deadline 204. In some embodiments, a derrick, mast, or drilling rig may already have an existing hydraulic line. In this way, existing hydraulic power may be leveraged to implement a deadline anchor of the present disclosure.

As mentioned above, the bolt 212 may be arranged through the two clamp plates 206, 208, and may be configured to pull or push the clamp plates together, by causing the pivoting clamp plate 208 to pivot toward the static clamp plate 206, for example, such that the deadline 204 may become clamped between the clamping inserts 202. The bolt 212 may have any suitable size and shape. It may be appreciated that in some embodiments, more than one bolt 212 may be used to clamp the clamp plates 206, 208 together. The bolt 212 may generally have a clamp portion 220 and an anchoring portion 222. The clamp portion 220 may be arranged through an opening in each of the clamp plates 206, 208, and may extend across the distance between the two clamp plates. The clamp portion 220 may have a length extending beyond an outer surface of each of the clamp plates 206, 208 in some embodiments. The clamp portion 220 may have an unthreaded outer surface in some embodiments. The anchoring portion 222 may extend from an end of the clamp portion 220. In some embodiments, the anchoring portion 222 may have a threaded outer surface such that a component with a corresponding inner threaded surface, such as a nut 216, may be screwed onto the bolt 212. The clamp portion 220 may be coupled to the anchoring portion 222 by a joint 224 in some embodiments. The joint 224 may be a pinned or hinged connection, for example. The joint 224 may generally allow at least some movement of each portion 220, 222 with respect to the other portion. In other embodiments, the clamp portion 220 and anchoring portion 222 may together comprise a single component.

In some embodiments, the bolt 212 may be arranged through one or more spacers 226. The spacer 226 may have an opening through which the anchoring portion 222 and/or clamp portion 220 may pass. In some embodiments, the joint 224 may be arranged within the spacer 226. The spacer 226 may be configured to provide separation between the clamp plates 206, 208 and the hydraulic cylinder 214 and/or nut 216. Additionally, in some embodiments, the spacer 226 may provide a leveraging surface for the hydraulic cylinder 214, providing a point or surface against which the hydraulic cylinder 214 may push in order to pull the bolt 212. The spacer 226 may be arranged near or adjacent to an outer surface of the static clamp plate 206 in some embodiments.

In some embodiments, the bolt 212 may extend beyond an outer surface of the pivoting clamp plate 208 and couple to an end block 228. The end block 228 may be arranged at an end of the bolt 212 opposing the anchoring portion 222 and/or an end opposing where the hydraulic cylinder 214 acts on the bolt. The end block 228 may be arranged near or adjacent to an outer surface of the pivoting clamp plate 208 in some embodiments. The end block 228 may generally apply pressure to the pivoting clamp plate 208, such that as the bolt 212 is pulled by the hydraulic cylinder 214, the bolt may cause the end block to press against an outer surface of the pivoting clamp plate, thus causing the pivoting clamp plate to pivot about pivot point 210, and toward the static clamp plate 206. In some embodiments, the bolt 212 may couple to the end block 228 via a joint 230. The joint 230 may be a pinned or hinged connection, for example. It may be appreciated that the two joints 230, 224 arranged on the bolt 212 may allow the clamp portion 220 of the bolt to have pinned end supports, and thus may reduce moments on the clamp portion of the bolt. The joints 230, 224 may generally allow for effective force application on the clamp plates 206, 208 as the angle of the pivoting clamp plate 208 changes with respect to the static clamp plate 206.

In some embodiments, one or more biasing mechanisms, such as Belleville springs 232 or Belleville washers, may be arranged on a portion of the bolt 212. For example, the one or more Belleville springs 232 may be arranged along the clamp portion 220 of the bolt 212, between the end block 228 and an outer surface of the pivoting clamp plate 208. In some embodiments, between 1 and 10 Belleville springs 232 may be provided on the bolt 212. Particularly, between 1 and 6 Belleville springs 232 may be provided in some embodiments. More particularly, the bolt 212 may have approximately 3 Belleville springs 232 in some embodiments. In other embodiments, the bolt 212 may have any other suitable number of Belleville springs 232. The Belleville springs 232 may be configured to provide a resistive force opposing the pull of the hydraulic cylinder 214 on the bolt 212. That is, as the hydraulic cylinder 214 operates on the bolt 212, the bolt may in turn pull the end block 228. The one or more Belleville springs 232 between the end block 228 and pivoting clamp plate 208 may compress or at least partially compress between the end block 228 and the pivoting clamp plate 208. The Belleville springs 232 may provide a visual indication that an appropriate clamping force is being applied to the bolt 212. That is, the Belleville springs 232 may be configured such that if the hydraulic cylinder 214 does not apply enough force to the bolt 212 to effectively clamp the deadline 204, the springs may remain uncompressed. In this way, the number of Belleville springs 232 and/or the stiffness of the springs may depend at least in part on the clamping force needed to effectively and safely clamp the deadline 204, such that the force needed to clamp the deadline may be similar to, or the same as, that needed to compress the Belleville springs 232.

In use, the deadline anchor 200 may operate to clamp the deadline 204 of a handling system in a fixed position. The anchor 200 may be used to initially clamp the deadline, and may be operated periodically or intermittently to adjust the clamp or to perform operations such as slip and cut operations on the line. Once the deadline 204 is arranged between the clamp inserts 202, the hydraulic cylinder 214 may operate to pull the pivoting clamp plate 208 toward the static clamp plate 206 by pulling on the bolt 212 via the end block 228. As the bolt 212 and end block 228 pull on the pivoting clamp plate 208, the clamp plate may pivot about the pivot point 210, causing the clamp inserts 202, arranged between the bolt 212 and pivot point 210, to tighten against the deadline 204. The hydraulic pressure pulling on the bolt 212 may in turn cause the one or more Belleville springs 232 to compress or partially compress, providing a visual indication that an effective clamping force has been achieved on the deadline 204. Once the appropriate clamping force is achieved, the nut 216 or other holding device may be tightened on the bolt 212 against the spacer 228 to hold the bolt in place with respect to the clamp plates 206, 208. The nut 216 may be tightened manually, partially manually, or automatically. The hydraulic cylinder 214 may then be disengaged in some embodiments. The hydraulic cylinder 214 may be reengaged to apply force to the bolt 212 when a next slip and cut operation needs to be performed or when the anchor 200 or deadline 204 otherwise needs adjusting or maintenance. In this way, the hydraulic cylinder 214 may only require operation intermittently. It may be appreciated that the deadline anchor 200 may be loosened with respect to the deadline 204 by loosening the nut 216 on the anchoring portion 222.

In some embodiments, the deadline anchor 200 may have one or more warning or alert systems configured to alert an operator of a particular condition or error. For example, a clamping force alert system may be arranged in communication with the Belleville washers and may be configured to provide a visual indication of force on the clamp plates 206, 208. The clamping force alert system may generally include a housing 240, a biasing mechanism such as a spring 242, a plunger 244, and a hydraulic relief valve 246. The housing 240 may be arranged on the deadline anchor 200. For example, the housing 240 may be arranged on outer surface of the pivoting clamp plate 208 in some embodiments. The housing 240 may be arranged relatively near the bolt 212, end block 228, and Belleville springs 232 in some embodiments. The housing 240 may be configured to house the spring 242 and plunger 244. The plunger 244 may be configured to be raised and lowered with respect to the housing 240. For example, the plunger 244 may extend from the housing 240 to provide a visual indicator. The plunger 244 may further withdraw into or partially into the housing 240 when not providing a visual alert. In some embodiments, the plunger 244 may have a visual indication, such as a red mark or light, that may be visible by an operator when the plunger is extended from the housing 240. The spring 242 may be configured to raise and lower the plunger 244. For example, when not compressed or only partially compressed, the spring 242 may be configured to bias the plunger in an extended position. The spring 242 may compress to withdraw the plunger 244. The hydraulic relief valve 246 may be arranged on the housing 240 and may be configured to release hydraulic pressure from the hydraulic cylinder 214 into the housing. The hydraulic relief valve 246 may direct hydraulic pressure from the hydraulic cylinder 214 to the housing 240 via a releaf line 248, such that hydraulic pressure at or above a particular threshold may cause the plunger 244 to withdraw and the spring 242 to compress.

In use, the clamping force alert system may provide an operator with an indication of wear on the Belleville springs, and thus an indication of effective clamping force. As described above, when the hydraulic cylinder 214 operates to pull the bolt 212 to tighten the clamp plates 206, 208, the Belleville springs 232 may compress to exert an opposing force. Thus, a particular level of hydraulic pressure may be needed to overcome the strength of the Belleville springs 232 and tighten the clamp. As the hydraulic cylinder 214 exerts pressure on the bolt 212, a portion of the pressure may be released into the housing 240 via the relief valve 246. If pressure meeting or exceeding a particular threshold is directed to the housing 240 via the relief valve 246, the plunger 244 may be withdrawn and the spring 242 compressed. For example, in some embodiments, the pressure relief valve 246 and/or releaf line 248 may have a particular threshold, such that once pressure from the hydraulic cylinder 214 exceeds the threshold, it may compress the spring 242. In some embodiments, the pressure threshold may be a threshold on the valve 246 and/or line 248 such that pressure may generally be permitted to pass through the valve and/or line once it exceeds the threshold. In other embodiments, the pressure threshold may be a spring threshold, such that the spring 242 may be configured with a spring constant such that hydraulic pressure below a particular threshold may not cause the spring to compress. In general, if the Belleville springs 232 are functioning effectively, a relatively large amount of hydraulic pressure will be needed to pull the bolt 212, and thus the pressure will exceed the pressure threshold of the relief valve 246, releaf line 248, spring 242, or other pressure threshold, and pressure will be directed to the housing 240 to compress the spring 242 and withdraw the plunger 244. When the plunger 244 is withdrawn, the alert marking on the plunger may not be visible, thus indicating that the Belleville springs are functioning effectively. However, when one or more of the Belleville springs 232 is functioning ineffectively, such as where one or more Belleville springs has become flattened and no longer provides the same compressive force, the bolt 212 may be pulled more easily and with a lower amount of hydraulic pressure. Thus, the pressure may be below the pressure threshold needed to enter the housing 240 via the valve 246 and/or needed to compress the spring 242. The plunger 244 may thus remain extended from the housing 240 and the indicator may be visible to an operator as a warning that the Belleville springs 232 are not functioning effectively. It is to be appreciated that the Belleville springs 232 themselves, or the block 228 may provide another indicator that one or more Belleville springs is not functioning effectively. Moreover, in some embodiments, when one or more of the Belleville springs 232 is not functioning effectively, the block 228 may be pulled closer to the pivoting clamp plate 208, and may operably hold the plunger 244 up, in an extended position, thus providing an additional or alternative indication that one or more Belleville springs is not functioning effectively. In some embodiments, a check valve may be flowably coupled to the housing 240, relief valve 246, and/or releaf line 248 for releasing hydraulic pressure in the housing, relief valve, and/or releaf line. For example, a check valve may be arranged in parallel with the pressure relief valve 246 in some embodiments.

Additionally, after the nut 216 is tightened and the hydraulic cylinder 214 is no longer applying pressure to the bolt 212, the clamping force alert system may continue to provide an indication of effective clamping on the deadline 204. When the hydraulic cylinder 214 is not actively supplying pressure, the spring 242 may remain uncompressed, such that the plunger 244 may generally extend outside of the housing 240. However, in some embodiments, when the nut 216 is tightened to maintain the pivoting clamp plate 208 in a clamping position, the Belleville springs 232 may be at least partially compressed such that the block 228 may be arranged relatively close to the pivoting clamp plate 208. In some embodiments, the block 228 may have a length, and may be arranged near the housing 240, such that the block may operate to prevent the plunger 244 from extending fully from the housing. That is, the block 228 may act on the plunger 244 to at least partially compress the spring 242 when the Belleville springs 232 are compressed or partially compressed. If the anchor 200 experiences a reduction in clamping force, the Belleville springs 232 may expand between the pivoting clamp plate 208 and block 228, thus causing the block to move beyond the plunger 244, and allowing the plunger to extend outside of the housing 240 to provide a warning or alert.

It may be appreciated that rather than the visual indicator of the plunger 244, in some embodiments, the clamping force alert system may activate a different visual alarm, such as a light, or an audio alarm or other alarm or indicator. For example, the plunger, spring, or valve may be communicably coupled to such an indicator.

Another warning or alert system may be an insert wear relief valve system that may provide an indication of wear or deformation on the clamp inserts 202. The insert wear relief valve system may generally have a relief valve 250 communicably coupled via a releaf line 252 to the hydraulic cylinder 214. The relief valve 250 may be coupled to a pin 254. The relief valve 250 may be arranged on a clamp plate 206, 208 in some embodiments. For example, in some embodiments, the relief valve 250 may be arranged on the pivoting clamp plate 208 and generally at or near the second end 209 of the clamp plate. In other embodiments, the relief valve 250 may be arranged on the static clamp plate 206. In still other embodiments, the relief valve 250 may be arranged at any other suitable location with respect to the anchor 200. In some embodiments, the relief valve 250 may be arranged on an outer surface of the pivoting clamp plate 208, and the pin 254 may extend from the relief valve, through the clamp plate, and may extend from an inner surface of the clamp plate. The pin 254 may further extend generally toward an inner surface of the static clamp plate 206. The pin 254 may be configured to open the relief valve 250, thus releasing hydraulic pressure from the line 252, when it is touched or pressed by the static clamp plate 206.

In use, the relief valve 250 may be configured to release pressure from the hydraulic cylinder 214 into the atmosphere to indicate that the clamp inserts 202 are worn or deformed. For example, as the clamp inserts 202 become worn or deformed, due to use over time for example, activation of the hydraulic cylinder 214 on the bolt 212 may cause the pivoting clamp plate 208 to pivot closer to the static clamp plate 206. That is, while a separation between the clamp plates 206, 208 may be maintained at the first end 207 via the pivot point 210, wear on the clamp inserts 202 may allow the pivoting clamp plate to move closer to the static clamp plate at the second end 209. When the pivoting clamp plate 208 pivots so close to the static clamp plate 206 that the static clamp plate touches an end of the pin 254, the relief valve 250 may be opened, thus releasing hydraulic pressure such that an operator is unable to continue hydraulically closing the clamp. It may be appreciated that in some embodiments, the relief valve 250 and pin 254 may be arranged on the static clamp plate 206, with the pin directed toward the pivoting clamp plate 208, such that the valve may be opened when the pivoting clamp plate touches or presses on the pin. When the relief valve 250 is opened, an operator may be unable to hydraulically close the clamp, which may prevent an unsafe clamping condition, but may also provide an indication to an operator that one or more clamp inserts 202 should be replaced or repaired. In some embodiments, the relief valve 250 may be coupled to an alarm or indicator, such as a light or audio alarm to further alert an operator.

Figure 3:
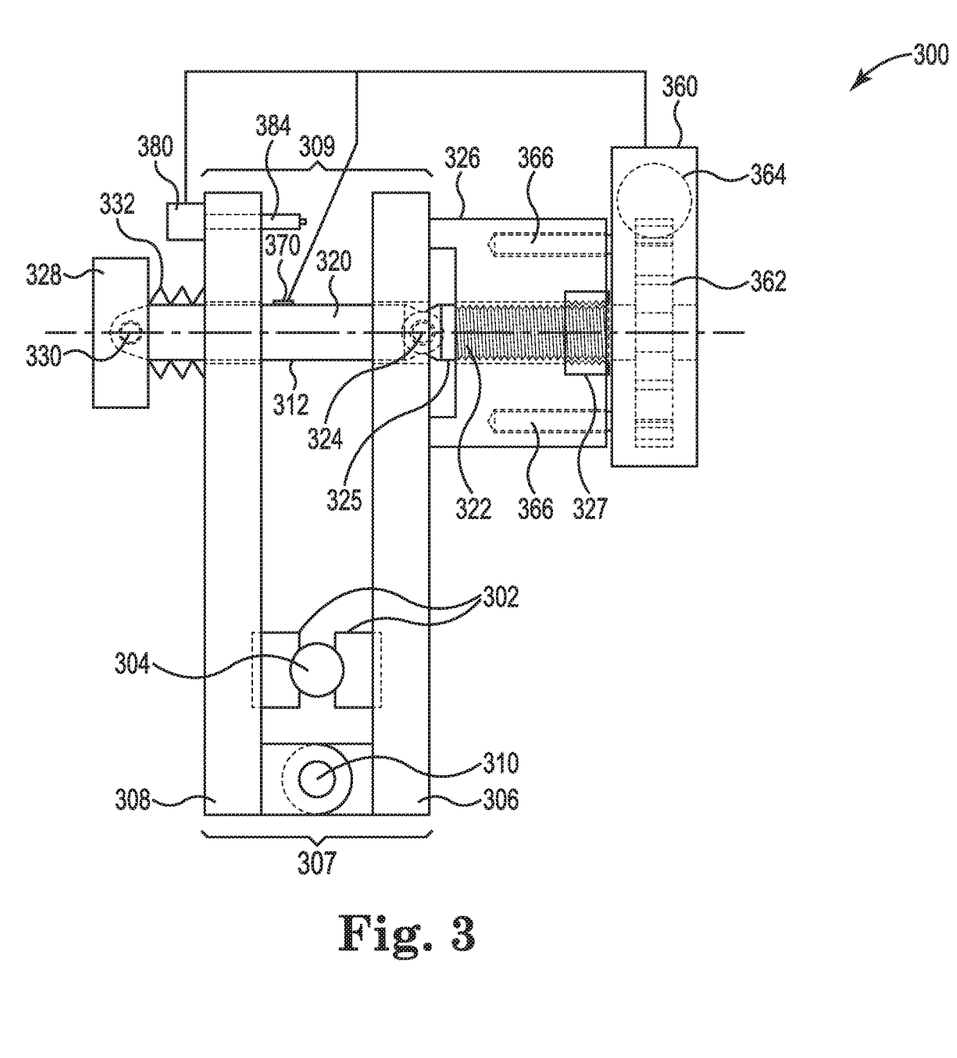
FIG. 3 is a schematic drawing of another deadline anchor of the present disclosure, according to one or more embodiments.

Turning now to FIG. 3, another deadline anchor 300 is shown, according to at least one embodiment. The deadline anchor 300 may be similar to the deadline anchor 200 discussed above, and may have many components similar to those discussed above. However, in some embodiments, rather than using a hydraulic cylinder, the deadline anchor 300 may be configure to operate electrically using an electric motor, for example. The motor may cause one or more gears to rotate to exert a linear force on a bolt, which may cause a pivoting clamp plate to pivot toward a static clamp plate, thus clamping a deadline.

As show in FIG. 3, the deadline anchor 300 may generally have a pair of clamp inserts 302 arranged about a deadline 304 and between a static clamp plate 306 and a pivoting clamp plate 308. The pivoting clamp plate 308 may be configured to pivot about a pivot point 310 arranged between the two clamp plates 306, 308 at a first end 307 of the clamp plates. A bolt 312 may be arranged through the two clamp plates 306, 308 at or near a second end 309, opposing the first end 307, of the clamp plates. A gearbox 360 may operate on the bolt 312 to cause the pivoting clamp plate 308 to pivot toward the static clamp plate 306. Moreover, one or more Belleville springs 332 arranged along the bolt 312 between an outer surface of the pivoting clamp plate 308 and an end block 328 may provide an indication of effective force on the clamping plates 306, 308.

The bolt 312 may generally have a clamp portion 320 and an anchoring portion 322 similar to those described above with respect to anchor 200. The clamp portion 320 and anchoring portion 322 may be coupled at a joint 324 in some embodiments, which may be similar to the joint 224 discussed above. Additionally or alternatively, a swivel point 325 may be arranged between the clamp portion 320 and anchoring portion 322. The swivel point 325 may be arranged near the joint 324, or in some embodiments may be incorporated with the joint. The swivel point 325 may allow the anchoring portion 322 to rotate independently of the clamp portion 320. A spacer 326 may be arranged between the clamp plates 306, 308 and the gearbox 360 in some embodiments. For example, the spacer 326 may be arranged between an outer surface of the static clamp plate 306 and the gearbox 360. The spacer 326 may have an opening configured to receive the bolt 312, such that the bolt may pass through the spacer as it extends between the gearbox 360 and the clamp plates 306, 308. The anchoring portion 322 may be arranged through the opening of the spacer 326 in some embodiments. In some embodiments, the opening in the spacer 326 may have threading 327 on at least a portion of the opening, the threading corresponding to threading of the anchoring portion 322 of the bolt 312. It may be appreciated that in some embodiments, the anchor 300 may have multiple bolts 312 and multiple corresponding openings in the spacer 326.

The gearbox 360 may be configured to pull or push the bolt 312, so as to pull the pivoting clamp plate 306 toward the static clamp plate 308. The gearbox 360 may include a worm gear configuration in some embodiments, comprising a primary gear 362 and a threaded shaft 364. The primary gear 362 may be a toothed gear having any suitable size and tooth spacing. The threaded shaft 364 may have any suitable size and may be arranged in communication with the primary gear 362. The threaded shaft 364 may have threading with spacing configured to fit with the teeth of the primary gear 362. That is, the threads of the threaded shaft 364 may be configured to fit between the teeth of the primary gear 362, such that rotation of the threaded shaft may in turn drive rotation of the primary gear. The gearbox 360 may be coupled to the bolt 312, such that rotation of the primary gear 362 may drive rotation of the anchoring portion 322 of the bolt. In some embodiments, the gearbox 360 may be arranged adjacent to or near the spacer 326. In some embodiments, one or more shafts 366 may extend from the gearbox 360 and into the spacer 326. The one or more shafts 366 may be configured to mitigate rotation of the gearbox and spacer with respect to one another, as the primary gear 364 causes the bolt 312 to rotate within the threading 327 of the spacer. The gearbox 360 may generally be driven by a motor, such as an electric motor, or any other suitable power source.

In use, the deadline anchor 300 may operate to clamp the deadline 304 of a handling system in a fixed position. The anchor 300 may be used to initially clamp the deadline, and may be operated periodically or intermittently to adjust the clamp or to perform operations such as slip and cut operations on the line. Once the deadline 304 is arranged between the clamp inserts 302, an electric motor or other power source may operate gearbox 360. The threaded shaft 364 may rotate, causing the primary gear 362 to rotate, which may in turn cause the anchoring portion 322 of the bolt 312 to rotate in a direction such that the threading on the bolt and within the spacer 326 may move the bolt linearly toward the gearbox 360 and/or away from the clamp plates 306, 308. The linear motion of the bolt 312 may operate to pull the pivoting clamp plate 308 toward the static clamp plate 306. As the bolt 312 and end block 328 pull on the pivoting clamp plate 308, the clamp plate may pivot about the pivot point 310, causing the clamp inserts 302, arranged between the bolt 312 and pivot point 310, to tighten against the deadline 304. The operation of the gearbox 360 on the bolt 312, and the resulting linear motion of the bolt, may in turn cause the one or more Belleville springs 332 to compress or partially compress, providing a visual indication that the clamping force has been achieved on the deadline 304. Once the appropriate clamping force is achieved, electric motor or other suitable power source may be disengaged in some embodiments. The anchoring portion 322 of the bolt 312 and the threading 327 within the spacer 326 opening may operate together to hold the bolt in place with respect to the clamp plates 306, 308. The electric motor or other power source coupled to the gearbox 360 may be reengaged to apply force to the bolt 312 when a next slip and cut operation needs to be performed or when the anchor 300 or deadline 304 otherwise needs adjusting or maintenance.

It may be appreciated that the deadline anchor 300 may be loosened by causing the bolt 316 to rotate in an opposing direction to the direction used to tighten the anchor. That is, loosening the anchor 300 may include rotating the threaded shaft 364 and primary gear 362 in a reverse direction, thus causing the anchoring portion 322 of the bolt 312 to rotate in a reverse direction with respect to the threading 327 within the spacer 326. This may cause the bolt 312 to move linearly away from the gearbox 360 and/or toward the clamp plates 306, 308, which may allow the pivoting clamp plate 308 to pivot away from the static clamp plate 306.

In some embodiments, the deadline anchor 300 may have one or more warning or alert systems configured to alert an operator of a particular condition or error. For example, a strain gauge 370 may be configured to provide an indication of force on the clamp plates 306, 308. The strain gauge 370 may be arranged on or near the bolt 312 and may measure the amount of force or strain on the bolt. The strain gauge 370 may be communicably coupled to an alarm or indicator in some embodiments. If the measured strain falls below a predetermined threshold, the alarm or indicator may be activated to indicate that an effective amount of force is no longer being applied to the bolt 312, and thus one or more of the Belleville springs 332 may be ineffective. It may be appreciated that the strain gauge 370 may operate continuously, both when the gearbox 360 is operating to pull the bolt 312 and when the anchor 300 is in a relatively static holding position. In some embodiments, the anchor 300 may additionally or alternatively have a power cut sensor 380. The power cut sensor 380 may be arranged on a clamp plate 306, 308 in some embodiments, and may be coupled to a pin 384. The power cut sensor 380 and pin 384 may operate similarly to the relief valve 250 and pin 254 described above with respect to FIG. 2 to mitigate worn or defective clamp inserts 302. The power cut sensor 380 may be communicably or electrically coupled to a power input for the gearbox 360 in some embodiments. The power cut sensor 380 may be configured to cut or reduce power to the gearbox when improper clamping is detected via the pin 384, as described above with respect to pin 254.

Figure 4:
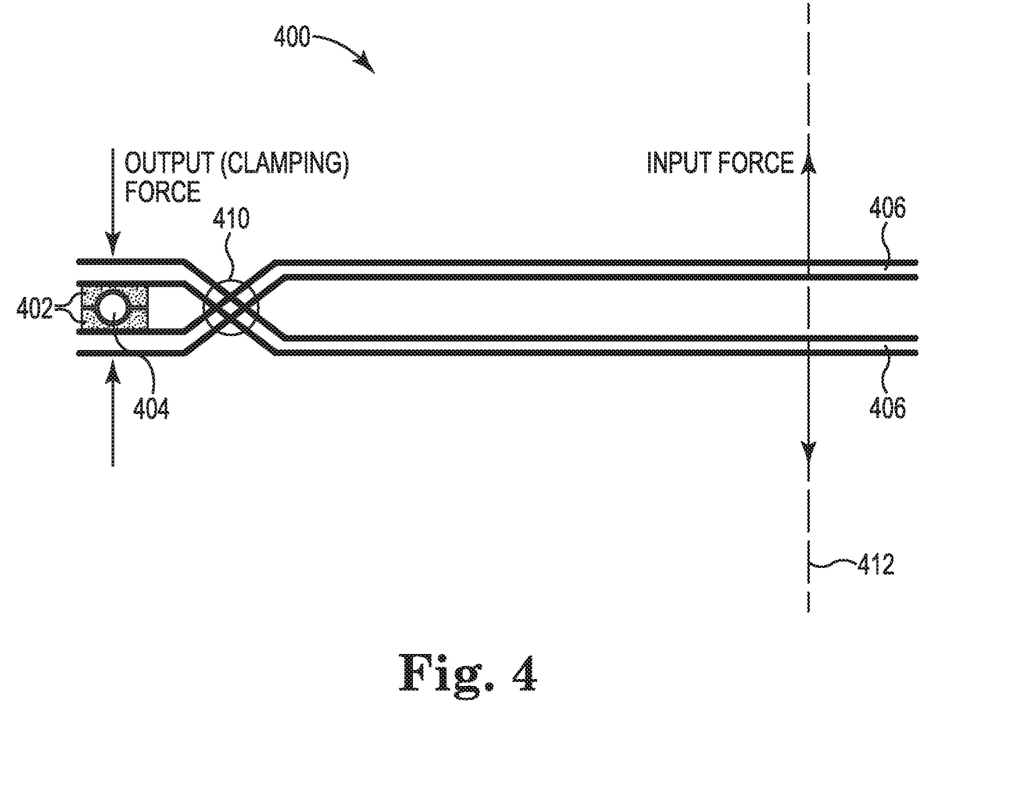
FIG. 4 is a schematic drawing of another deadline anchor of the present disclosure, according to one or more embodiments.

It is to be appreciated that the pivot point of a deadline anchor of the present disclosure and the clamped position of the deadline may be alternatively configured in some embodiments. For example, in some embodiments, a deadline anchor of the present disclosure may be configured to provide a clamping force on a deadline via a pulling force acting on a pair of clamping plates, wherein the pivot point for one or more of the clamp plates may be arranged between the point at which the pulling force acts and the clamping position of the deadline. This is schematically illustrated, according to at least one embodiment, in FIG. 4. As shown in FIG. 4, a deadline 404 may be arranged between a pair of generally parallel clamp plates 406. A pair of clamp inserts 402 may be arranged such that a clamp insert is arranged between the deadline and each of the two clamp plates 406. One or both of the clamp plates 406 may be pivotable about a pivot point 410. Additionally, an input force may be directed on one or both of the clamp plates 406. The input force may operate or act at a force plane 412. In some embodiments, the input force may be configured to push or pull at least one of the clamp plates 406, and may cause one or both of the clamp plates to pivot about the pivot point 410. The input force may generally operate to push or pull the clamp plates 406 apart along the force plane 412. In some embodiments, the pivot point 410 may be arranged at a point along the length of the clamp plates 406, between the deadline 404 and the force plane 412. In this way, the clamp plates 406 may generally operate similarly to those described above with respect to FIGS. 2 and 3, except that one or more of the clamp plates may be configured to pivot outward, away from the opposing clamp plate, rather than inward. For example, a hydraulic cylinder may operate to pull on of the clamp plates 406 along the force plane 412, away from the opposing clamp plate, causing the pulled plate to pivot about the pivot point 410. In this way, the one or more pivoting clamp plates may be leveraged as a force amplifier, similarly to those described above, to exert a clamping force on the deadline 404. Other components of the deadline anchor 400 may be similar to, or the same as, those described above with respect to FIGS. 2 and/or 3.

It is to be appreciated that devices, components, and concepts described herein are not limited to the particular embodiment(s) with which they are shown or described. That is, devices, components, and concepts described herein with respect to various embodiments may be incorporated into other embodiments. For example, devices, components, and concepts described with respect to the embodiment shown in FIG. 2 may be operably combined with devices, components, and concepts described with respect to the embodiment shown in FIG. 3, and vice versa. As a particular example, the strain gauge 370 described with respect to FIG. 3 may be incorporated with the hydraulics described with respect to FIG. 2.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A deadline anchor for a handling system, the deadline anchor comprising:
    a pair of clamp plates configured to receive a deadline therebetween, wherein at least one clamp plate is configured to pivot about a pivot point arranged at a first end of the pair of clamp plates;
    a bolt arranged through an opening in each of the clamp plates and at an end opposite the first end; and
    an actuator coupled to the bolt and configured to apply a force to the bolt;
    wherein the clamp plates are configured to receive the deadline at a location between the first end and the bolt.

2. The deadline anchor of claim 1, wherein the actuator comprises a hydraulic cylinder.

3. The deadline anchor of claim 1, wherein the actuator comprises a gearbox.

4. The deadline anchor of claim 3, wherein the gearbox comprises a primary gear and a rotating shaft in communication with the primary gear.

5. The deadline anchor of claim 3, further comprising an electric motor coupled to the gearbox.

6. The deadline anchor of claim 1, further comprising a pair of clamp inserts, each clamp insert arranged between one of the pair of clamp plates and the deadline.

7. The deadline anchor of claim 1, further comprising a spacer arranged between the actuator and the pair of clamp plates.

8. The deadline anchor of claim 7, wherein the bolt is arranged through an opening in the spacer.

9. The deadline anchor of claim 1, wherein the bolt comprises a swivel point.

10. The deadline anchor of claim 1, further comprising at least one spring arranged on the bolt and configured to provide a visual indication of force on the bolt.

11. The deadline anchor of claim 10, wherein the at least one spring is a Belleville spring.

12. The deadline anchor of claim 1, further comprising an end block coupled to the bolt near an outer surface of one of the clamp plates.

13. The deadline anchor of claim 2, further comprising a clamping force alert system, comprising:
    a housing coupled to the hydraulic cylinder via a pressure line;
    a plunger extending from the housing; and
    a spring arranged within the housing;

wherein when an effective amount of hydraulic pressure is applied to the bolt, the pressure in the line will cause the spring to compress, and the plunger to retract.

14. The deadline anchor of claim 2, further comprising a pressure relief valve arranged on one of the clamp plates and comprising a pin, the pressure relief valve configured to open to release hydraulic pressure when the pin touches the second clamp plate.

15. The deadline anchor of claim 1, further comprising a strain gauge arranged on the bolt.

16. The deadline anchor of claim 15, further comprising a power cut sensor communicably coupled to the strain gauge.

17. A method of tightening a deadline anchor, the method comprising:

applying a linear force to a bolt that is arranged through a pivoting clamp plate and a static clamp plate, the pivoting clamp plate being pivotally coupled to the static clamp plate at a pivot point arranged at a first end of the pivoting clamp plate and the bolt being arranged at an end opposite the first end, wherein applying the linear force to the bolt causes the bolt to pull the pivoting clamp plate about the pivot point and toward the static clamp plate.

18. The method of claim 17, further comprising tightening a nut on t to secure the bolt with respect to the clamp plates.

19. The method of claim 17, wherein applying a linear force comprises activating a hydraulic cylinder.

20. The method of claim 17, wherein applying a linear force comprises activating a gearbox comprising a worm gear.

* * * * *

UNITED STATES PATENT AND TRADEMARK OFFICE
CERTIFICATE OF CORRECTION

PATENT NO. : 10,670,112 B2  
APPLICATION NO. : 15/483477  
DATED : June 2, 2020  
INVENTOR(S) : Kaybidge et al.

It is certified that error appears in the above-identified patent and that said Letters Patent is hereby corrected as shown below:

In the Claims

Column 15, Line 26, Claim 18, delete "t" and insert --the bolt-- therefor

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*